United States Patent [19]
Giacometti

[11] Patent Number: 5,309,250
[45] Date of Patent: May 3, 1994

[54] METHOD FOR DETERMINING THE STATIONARY POSITION OF THE LINE OF SIGHT OF A FILMING DEVICE SUBJECT TO VIBRATIONS, DEVICE FOR IMPLEMENTATION THEREOF AND APPLICATION TO THE HARMONIZATION OF FILMING DEVICES

[75] Inventor: Emmanuel M. Giacometti, Pelissanne, France

[73] Assignee: Societe Anonyme dite: Aerospatiale Societe Nationale Industrielle, Paris, France

[21] Appl. No.: 900,954

[22] Filed: Jun. 18, 1992

[30] Foreign Application Priority Data

Jun. 25, 1991 [FR] France ............... 91 07805

[51] Int. Cl.$^5$ .............................................. H04N 1/00
[52] U.S. Cl. .................................... 358/406; 359/554; 348/208
[58] Field of Search ................. 358/222, 406, 139; 359/554, 555, 556, 557; 354/70, 71

[56] References Cited

U.S. PATENT DOCUMENTS

| 4,732,470 | 3/1988 | Priddy | 356/124 |
| 5,155,520 | 10/1992 | Nagasaki et al. | 358/222 |
| 5,184,216 | 2/1993 | Kobayashi | 358/222 |
| 5,198,896 | 3/1993 | Kondo et al. | 358/222 |

FOREIGN PATENT DOCUMENTS

| 256915 | 2/1988 | European Pat. Off. | F41G 3/32 |
| 419320 | 3/1991 | European Pat. Off. | F41G 3/32 |
| 2580865 | 10/1986 | France | H01J 31/50 |

*Primary Examiner*—Edward L. Coles, Sr.
*Assistant Examiner*—Madeleine Nguyen
*Attorney, Agent, or Firm*—Marshall, O'Toole, Gerstein, Murray & Borun

[57] ABSTRACT

In a method and device for determining the stationary position of the line of sight of a video filming device subject to periodic vibrations, the video signal produced by the device is sampled by means of sampling signals coming from a vibration detector detecting the vibrations. The image observed by the filming device is reconstituted using the sampled video signals, and the position of the stationary reconstituted image corresponding to the stationary line of sight is determined from the reconstituted image.

19 Claims, 4 Drawing Sheets

METHOD FOR DETERMINING THE STATIONARY POSITION OF THE LINE OF SIGHT OF A FILMING DEVICE SUBJECT TO VIBRATIONS, DEVICE FOR IMPLEMENTATION THEREOF AND APPLICATION TO THE HARMONIZATION OF FILMING DEVICES

The present invention relates to a method and a device permitting determination of the orientation of the stationary line of sight of a filming device subject to vibrations, and also permitting determination of, and reduction in, the harmonization error of such a filming device with respect to another filming device.

Methods and systems are known permitting determination of the orientation of the line of sight of a filming device providing a video image, and determination of and reduction in the harmonization error of this filming device with respect to another.

Thus, French Patent FR-A-2 602 389 describes a system making it possible to set the angular positions of two video cameras, mounted on an aircraft, and for example integral respectively with a viewfinder and with a gun. The principle used consists in directing the line of sight of each camera towards an object situated a sufficient distance away for the parallax error to be negligible. The video signals arising from the two cameras are interlaced on a video screen, this bringing about the superposition of two offset images, each indicative of the orientation of the line of sight of the corresponding camera.

The harmonization error can thus be determined as a function of the offset of the two images on the screen.

Moreover, this error can be reduced and cancelled out by setting the relative angular positions of the lines of sight of the two cameras, by rotating one of them until the two images are made to coincide. Thus, the viewfinder used by the pilot of the aircraft becomes harmonized with the gun.

Such a system, however, has the disadvantage of requiring good stability of the cameras, so as to obtain sharp images, which forces this adjustment to be done on the ground, in the absence of vibrations.

Now, in the case of an aircraft, for example, the latter's structure is liable to be deformed when it is in flight, under the effect of the modification of the surfaces bearing the aerodynamic forces and/or the accelerations.

The present invention, relating to the determination of the orientation of the line of sight of a filming device subject to vibrations, to the determination and correction of the harmonization error of such a filming device with respect to a second filming device, aims to resolve this problem.

To this effect, according to the invention, the method for determining the stationary position of the line of sight of a filming device, subject to periodic vibrations and delivering a video signal representing the image of the field which it is observing, is notable in that it comprises the following steps:

said vibrations are detected and from them is generated a succession of synchronizing signals each having a specified phase within the period of said vibrations;

from said succession of synchronizing signals is generated a succession of sampling signals each having a same adjustable delay with respect to the corresponding synchronizing signal;

said video signal is sampled by means of the succession of said sampling signals, this providing a succession of sampled video signals;

said image is reconstituted, on a display device, by means of the succession of said sampled video signals, this providing a reconstituted image; and the position of the stationary reconstituted image corresponding to the stationary line of sight is determined from the reconstituted image.

Thus, with the filming device taking a certain time to pass from one extreme angular position to the other, during its vibrations, video signal slices, each representing a portion of the image, for example a line, are read cyclically by sampling only when this filming device has a well-defined momentary orientation. This is carried out by commanding the sampling at a well-determined interval within the period of the vibration, and defined by a delay with respect to a reference interval, fixed with respect to said vibration period, and provided by the motion detector which can, for example, be an acceleration detector.

When a sufficient number of video signal slices has been read by sampling, each representing a different portion of the image, all these slices make it possible to reconstitute the full image relating to the momentary direction of the line of sight, and this without blurring due to the vibratory motion.

In particular, the method according to the invention makes it possible to determine the position of the stationary reconstituted image corresponding to the stationary line of sight by means of the following steps:

the extreme positions are determined of the displacement of the reconstituted image on the display device, by varying said adjustable delay; and said adjustable delay is set in such a way that the reconstituted image occupies a position midway between said extreme positions.

Thus, by varying said variable delay over a time range at least equal to a period of the vibratory motion, it is possible to mark the extreme positions occupied by the image and to deduce therefrom the median position, corresponding to the orientation of the stationary line of sight, that is to say in the absence of vibrations.

Advantageously, the method according to the invention makes it possible to generate, during each period of the vibration, two synchronizing signals spaced half a vibration period apart, this causing the formation of a pair of reconstituted images.

Thus, two reconstituted images are obtained, occupying symmetrical positions with respect to the median position of the possible displacement, this making it possible to obtain simultaneously the two extreme positions of the reconstituted image.

In particular, the fact that a pair of reconstituted images is available offers the advantage of making it possible to set said adjustable delay in such a way as to superimpose the reconstituted images of said pair of reconstituted images, on the display device.

The adjusting of the delay corresponding to a reconstituted image relating to the sighting axis of the sighting device can thus be done by utilizing the symmetry of the two images with respect to the position corresponding to the image relating to the stationary line of sight, this avoiding having to mark the extreme positions of an image, and avoiding the error associated therewith.

Furthermore, the method of harmonizing a first filming device, subject to periodic vibrations, with respect to a second filming device oriented fixedly substantially in the same direction as the first filming device, providing respectively a first video signal and a second video signal, representing respectively a first image and a second image corresponding respectively to the image of their observed field, is notable in that it comprises the following steps:

said vibrations are detected and from them is generated a succession of synchronizing signals each having a specified phase within the period of said vibrations;

from said succession of synchronizing signals is generated a succession of sampling signals each having a same adjustable delay with respect to the corresponding synchronizing signal;

said first video signal and second video signal are sampled alternately by means of the succession of said sampling signals, this providing a succession of first sampled video signals and second sampled video signals;

said first image and second image are reconstituted on a display device by means of the succession of said sampled video signals, this providing a first reconstituted image and a second stationary reconstituted image;

the respective positions are determined of the first stationary reconstituted image and of the second stationary reconstituted image corresponding respectively to the stationary line of sight of the first filming device and to the line of sight of the second filming device, from the first reconstituted image and the second stationary reconstituted image; and from said respective positions of the first stationary reconstituted image and of the second stationary reconstituted image is determined the angular harmonization deviation of said first filming device and second filming device.

Two stable images are thus obtained, each relating to one filming device, and for which it is possible, for each of the latter, to determine the median position corresponding to the reconstituted image relating to the stationary line of sight, in the absence of vibrations. By comparing these median positions, it is then possible to determine the harmonization error between the two lines of sight of the two filming devices.

In particular, the determination of the respective positions of the first stationary reconstituted image and of the second stationary reconstituted image can be done by the following steps:

the extreme positions are determined of the displacement of the first reconstituted image by varying said adjustable delay; and said adjustable delay is set in such a way that said first reconstituted image occupies a position midway between said extreme positions.

Thus, through a single adjustment, the median positions are determined of the lines of sight of the two filming devices, this enabling the harmonization error to be deduced therefrom.

Moreover, the method according to the invention makes it possible to generate, during each period of the vibration, two synchronizing signals spaced apart by half a vibration period, this causing the formation of a pair of first reconstituted images and of a second stationary reconstituted image, corresponding respectively to the first video signal and to the second video signal.

It is thus possible, for the filming device which is vibrating, to have available two reconstituted images arranged symmetrically with respect to their median position, which enables this median position to be readily determined.

In particular, the method according to the invention makes it possible to set said adjustable delay in such a way that, on the display device, the two reconstituted images of said pair of first reconstituted images are superimposed.

The adjustment corresponding to the median position of the displacement of the reconstituted image of each filming device is thus easily performed, without having to mark the extreme positions of the displacement.

This method, applied to a first filming device and to a second filming device, at least one of which is able to swivel, under the effect of a swivel command, in a direction of swivel permitting adjustment of the harmonization of said filming devices, can be followed by the following step:

said swivel command is activated in such a way as to bring said first stationary reconstituted image and second stationary reconstituted image towards one another.

The harmonization of the two filming devices is thus adjusted whilst observing the result of the adjustment on the display device, this affording high speed and accuracy in respect of this adjustment.

Furthermore, according to the invention, the method of determining the harmonization error of a first line of sight of a first filming device, subject to first periodic vibrations, with respect to a second line of sight of a second filming device, subject to second periodic vibrations, oriented substantially in the same direction as the first filming device, providing respectively a first video signal and a second video signal, respectively representing the image of their observed field, is notable in that it comprises the following steps:

said first vibrations are detected and from them is generated a succession of first synchronizing signals each having a specified phase within the period of said first vibrations;

said second vibrations are detected and from them is generated a succession of second synchronizing signals each having a specified phase within the period of said second vibrations;

from said succession of first synchronizing signals is generated a succession of first sampling signals each having a same adjustable delay with respect to the first corresponding synchronizing signal;

from said succession of second synchronizing signals is generated a succession of second sampling signals each having a same adjustable delay with respect to the second corresponding synchronizing signal;

said first video signal and second video signal are sampled by means, respectively, of the succession of said first sampling signal and second sampling signal, this providing respectively a succession of first sampled video signals and a succession of second sampled video signals;

said first image and second image are reconstituted on a display device by means of said succession of first sampled video signals and succession of second sampled signals, this providing a first reconstituted image and a second reconstituted image;

the respective positions are determined of the first stationary reconstituted image and of the second stationary reconstituted image corresponding respectively to the stationary line of sight of the first filming device and to the stationary line of sight of the second filming device, from the first reconstituted image and second reconstituted image; and from said respective positions of the first stationary reconstituted image and of the second stationary reconstituted image is determined the angular harmonization deviation of said first line of sight and second line of sight.

It is thus possible to determine the median position of the image of a filming device, independently of the frequency or of the relative phase of the vibrations which the other filming device experiences.

In particular, this method makes it possible to determine the respective positions of the first stationary reconstituted image corresponding to the first stationary line of sight and of the second stationary reconstituted image corresponding to the second stationary line of sight, by means of the following steps:

the extreme positions are determined of the displacement of the first reconstituted image of the first filming device by varying said first adjustable delay;

said first adjustable delay is set in such a way that said first reconstituted image occupies a position midway between said first extreme positions;

the second extreme positions are determined of the displacement of the second reconstituted image of the second filming device by varying said second adjustable delay; and said second adjustable delay is set in such a way that said second reconstituted image occupies a position midway between said second extreme positions.

In this way, for each filming device, the extreme positions are determined of the reconstituted image, and the median position is deduced therefrom of the reconstituted image corresponding to the stationary line of sight.

Moreover, this method offers the advantage of making it possible to generate two synchronizing signals spaced half a vibration period apart, this causing the formation of a pair of first reconstituted images and of a pair of second reconstituted images, corresponding respectively to the first video signal and to the second video signal.

It is thus possible to choose a time reference specific to the vibrations of each filming device, this giving complete freedom to choose, for each motion detector, a sampling interval, within the period of vibration, which is indeed peculiar to the momentary position of the filming device. This is of particular interest when the filming device is subject to composite vibratory movements liable to give rise to a non-monotonic vibratory trajectory during each half-period, there then being a risk of the motion-detecting device producing unwanted synchronizing signals.

In particular, this method makes it possible to set said first adjustable delay and second adjustable delay, in such a way that, for each pair of said reconstituted images, said first reconstituted image and second reconstituted image are superimposed, on the display device.

It is thus possible rapidly to determine the position of the reconstituted image of each filming device corresponding to its stationary line of sight.

This method, applied to a first filming device and to a second filming device, at least one of which is able to swivel, under the effect of a swivel command, in a direction of swivel permitting adjustment of the harmonization of said filming devices, can be followed by the following step:

said swivel command is activated in such a way as to bring together the respective reconstituted images relating to the stationary direction of the first filming device and of the second filming device.

In this way the harmonization of the filming devices is rapidly and accurately adjusted while observing the result of the adjustment on the display device.

For the implementation of said method, a device for determining the orientation, with respect to a fixed reference frame, of the stationary line of sight of a first filming device subject to vibrations, and providing a first video signal representing the image of its field, is notable in that it comprises:

a motion detector detecting said vibrations, and producing a synchronizing signal having a specified phase with respect to said vibrations;

a shaping circuit receiving said synchronizing signal and providing, in response, a sampling signal;

a sampler receiving said first video signal on a first signal input, able to sample said first video signal and provide a first sampled video signal, under the control of said sampling signal applied to a sampling control input;

a memory, receiving and storing said first sampled video signal;

a display device, receiving, from said memory, an image information item and providing, in response, a reconstituted image;

a time base controlling the sequencing of the operation of said memory.

The sampling of the video signal is thus performed when the filming device has a momentary orientation which is identical from one sampling to the next, this making it possible to join up video signal slices relating to the same orientation of the filming device and furnishing a reconstituted image free of blurring due to vibrations.

Moreover, said shaping circuit can provide a sampling control signal delayed with respect to said synchronizing signal.

The reconstituted image thus has a position, on the display device, which depends on said delay.

Furthermore, said motion detector can advantageously provide two synchronizing signals during each period of said vibrations, said signals being spaced apart by half said period.

The two reconstituted images straddle the position of the image corresponding to the stationary line of sight, this making it possible to determine the position of the latter.

The said shaping circuit can, moreover, comprise a delay control input enabling said delay to be adjusted.

By modifying this delay, it is thus possible to determine, by observation of the reconstituted image, the position of the image corresponding to the stationary line of sight.

Furthermore, a device for determining the harmonization error between a first line of sight of a first filming device associated with a device for determining the stationary position of this first line of sight, and a second line of sight of a second filming device oriented fixedly substantially in the same direction as the first line of sight, providing a second video signal representing a second image representing the field which it is observing is notable in that said second video signal is applied to a second signal input of said sampler, and in that said time base provides said sampler with a switching signal making a sampled video signal representing respectively said first video signal and second video signal appear alternately at the output of said sampler.

It is thus possible to make the reconstituted images relating to the two filming devices appear simultaneously on the display device, this making it possible to determine the harmonization error, and making it possible to reduce it by controlling the rotation of one of the filming devices.

The figures of the attached drawing will make clearly understood how the invention can be embodied. In these figures, identical references designate similar elements.

Figure 1:
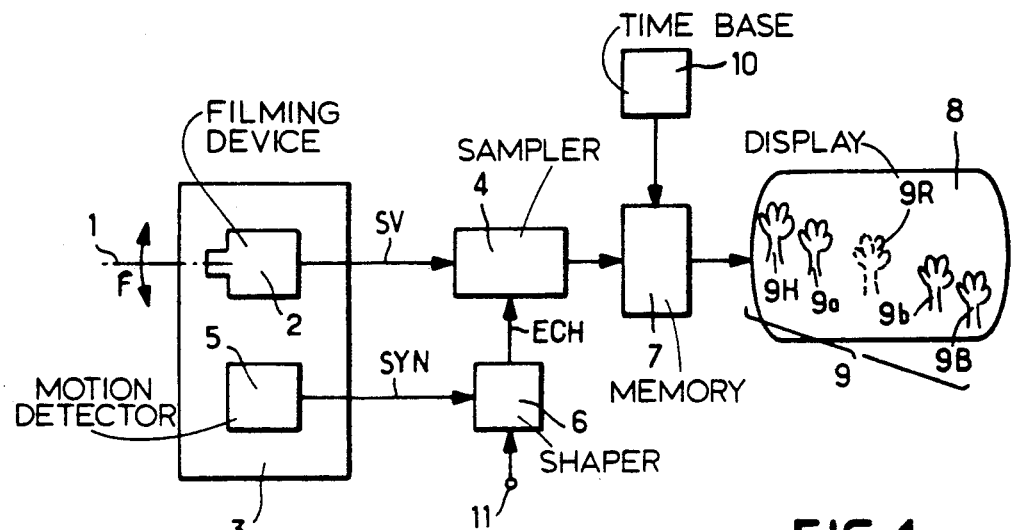
FIG. 1 is a block diagram illustrating the method of determining the orientation of a filming device.

The device, in accordance with the present invention and represented in FIG. 1, is intended for determining the stationary position of the line of sight 1 of a filming device 2 subject to vibrations f, symbolized by arrows.

This filming device 2, integral with a chassis 3, is oriented towards a scene and provides a video signal SV representing the image, consisting of a set of points, of the observed field. In a known manner, it comprises electronics for sequential scanning, and said video signal SV is representative of this set of points. Because the filming device 2 vibrates at a pace defined by the period of said vibrations f, each of these points is read, by the scanning electronics, in an interval which corresponds to a momentary orientation of the line of sight 1, which differs from that of the other points of the same image. Since the video signal SV of an image consists of the juxtaposition of the video signals representative of the various points of the image, the image thus constituted is found to have a distortion and a blurring owing to the fact that the various points constituting it have been read, by the scanning electronics, in different intervals, and hence along orientations of the line of sight 1 which are not exactly identical.

So as to avoid these defects, according to the invention, the video signal SV is sampled by a sampler 4 receiving said video signal SV on a signal input. This sampler 4 allows this video signal SV to pass only when the line of sight 1 has an orientation defined beforehand, thereby eliminating the video signal SV relating to the other orientations of this line sight 1. Moreover, as has just been explained, the filming device 2 moves during the scanning of the set of lines constituting an image. To overcome this, account is only taken, by means of the sampler 4, of a time slice, fairly short with respect to the duration of an image, of the video signal SV of the image, which corresponds to points of this image which have been scanned, by the scanning electronics of the filming device 2, at very close intervals, and hence between which the filming device 2 has scarcely moved. For example, such a slice of the video signal SV is constituted by the video signal representing one or a few successive lines of the frame of the image. So as to reconstitute the full image, this operation must be repeated on each passage of the line of sight 1 into said orientation defined beforehand, while then sampling slices of video signal SV which relate to other portions of the image.

So as to have available a time reference determining the interval of passage through said orientation defined beforehand, that is to say the interval in which the video signal SV must be sampled, use is made of a motion detector 5, integral with the chassis 3, for example an accelerometer, which provides a synchronizing signal SYN having a well-defined phase with respect to the period of the vibrations f. In the case of an accelerometer, said synchronizing signal SYN is delivered when the acceleration has a well-defined value. This synchronizing signal SYN is applied to a shaping circuit 6 which provides, in response, with an adjustable delay, a sampling signal ECH of specified duration, applied to a sampling input of said sampler 4, and which has the effect of allowing passage of the video signal SV towards that output of said sampler 4 which is connected to a memory 7 controlling the refreshing of the image depicted on a display device 8, providing a reconstituted image 9.

A time base 10 controls the sequencing of the operation, in write and read modes, of the memory 7, at a pace which is not synchronized with that of the vibrations f. Because of this, as will be explained in detail with regard to FIG. 2, the sampling interval has a variable position within the period of the frame of the image, which means that slices of video signal SV which relate to various portions of the image are sampled successively. Having stored in memory a sufficient number of slices, it is thus possible to reconstitute the full image. This assumes that the observed scene has not moved for the duration of taking of the successive samples.

Having thus obtained a stable reconstituted image 9 relating to a specified but unknown orientation of the line of sight 1, the position is then determined of the reconstituted image 9R relating to the stationary position of the line of sight 1.

To do this, the interval in which the sampling is performed is varied, within the period of the vibration f, whilst delaying the sampling signal ECH by means of a command applied to a delay control input 11 of the shaping circuit 6. The phase shift thus introduced by this delay makes it possible, by varying the latter, to obtain a succession of reconstituted images 9 for the whole of the period of the vibration f, and hence to determine the extreme positions 9H and 9B of the displacement of the reconstituted image 9, corresponding to the extreme amplitudes of the angular displacement of the filming device 2. The position of the reconstituted image 9R, corresponding to the stationary orientation of the filming device 2, is then found to have to be midway between these two extreme positions 9H and 9B. Having marked, on the display device 8, these extreme positions 9H and 9B, it is then sufficient to set the delay for the sampling signal ECH in order to bring the reconstituted image 9 to the position of the reconstituted image 9R relating to the stationary orientation of the filming device 2, determined by interpolation from the extreme positions 9H and 9B, and situated midway between them.

In a variant, which will be explained in detail in connection with FIG. 3, intended to facilitate final adjustment of the position of the reconstituted image 9R, the motion detector 5 generates two synchronizing signals SYN, during each period of the vibration f, and spaces apart by a half-period of this vibration f. Thus, two reconstituted images 9a and 9b are obtained, occupying a symmetrical position with respect to the position of the reconstituted image 9R relating to the stationary orientation of the line of sight 1. It then suffices to set the adjustable delay in order to superimpose these two reconstituted images 9a and 9b, this determining the position of the reconstituted image 9R desired.

Figure 2:
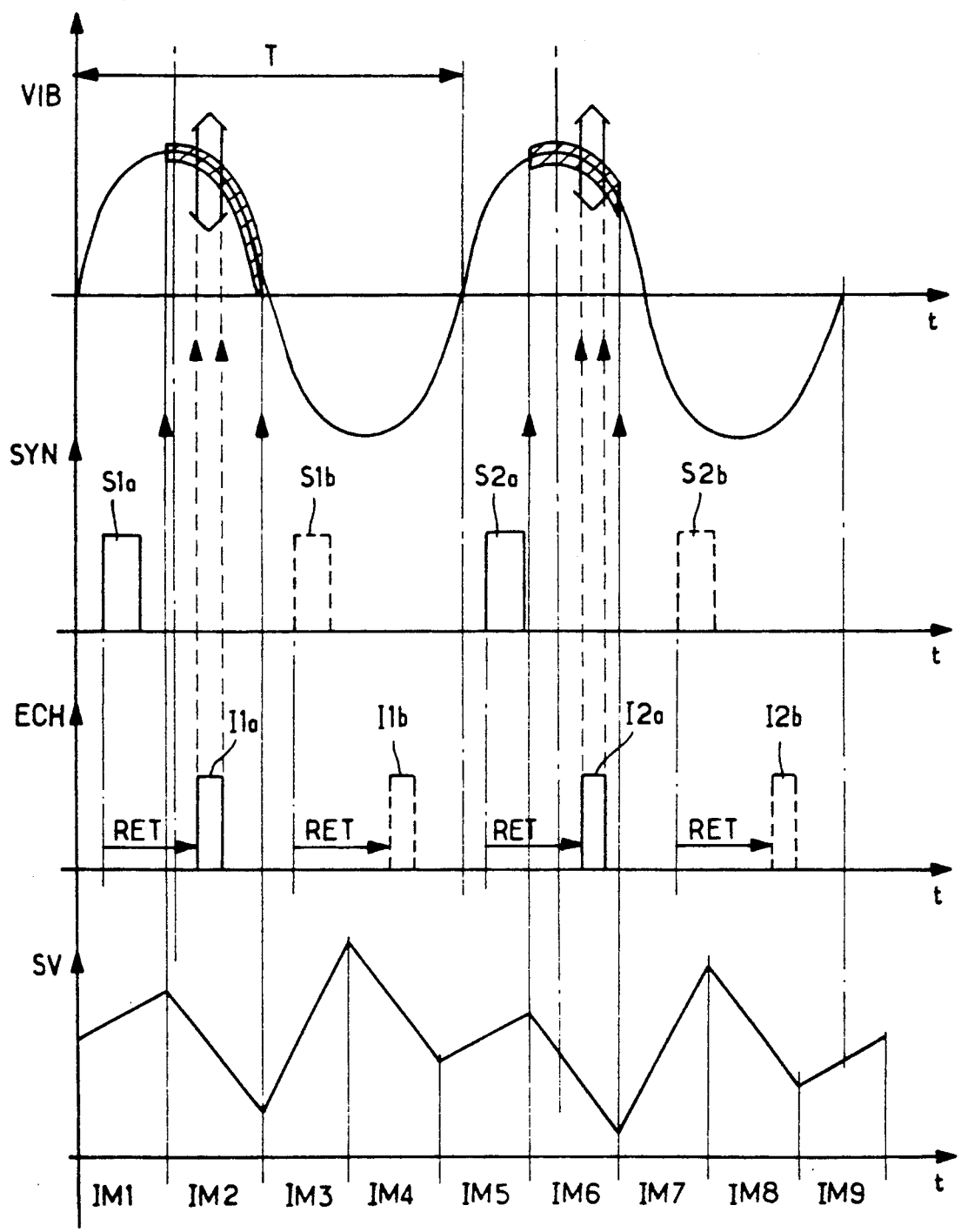
FIG. 2 is a time chart illustrating the sampling.

FIG. 2 is a time chart illustrating the sequencing of the various signals. The value of the angular variation of the orientation of the line of sight 1, due to the vibrations f, is represented by a sinusoid of period T whose amplitude VIB varies with time. When this amplitude VIB passes through a certain value, a first pulse S1a of the synchronizing signal SYN, belonging to a first series of synchronizing pulses, is generated by the motion detector 5. After a delay RET with respect to the start of this first pulse S1a, the shaping circuit 6 generates a sampling signal ECH in the form of a first pulse I1a of predetermined duration, belonging to a first series of sampling pulses. This first pulse I1a makes possible the transmission, towards the memory 7, of the video signal SV present for the duration of this first pulse I1a. For the sake of clarity, this video signal SV is represented in the form of a sequence of sloping segments, each corresponding to one image IMi, with i=1 to 9 in this figure, belonging to the sequence of successive images taken by the filming device 2 according to its various orientations. It is thus seen that part of the video signal SV of the image IM2 is sampled, this portion corresponding approximately to the start of this image IM2. In the sinusoid representing the vibration VIB, the highlighted stretch corresponds to the duration for which the image IM2 exists, and the associated double arrow indicates the interval for which the first pulse I1a allows passage of the video signal SV of this image IM2; as explained above, this sampling interval has a fixed position with respect to the said period T, for a fixed delay RET.

During the succeeding period T of the vibration f, a second synchronizing pulse S2a is generated, spaced exactly, with respect to this first synchronizing pulse S1a, by the value of this period T. Likewise, a second sampling pulse I2a is generated, delayed by the delay RET with respect to this second pulse I2a, which means that this second pulse I2a is delayed by one period T with respect to the first pulse I1a, and therefore corresponds to the same momentary orientation of the line of sight 1. The image then taken by the filming device 2 is the image IM6, in this example. It is noted that there is not an integer number of images during the period T of the vibrations f. Because of this, the second sampling pulse I2a does not have the same relative position within the duration of this image IM6; in this example, it is seen that a portion of the video signal SV corresponding rather to the end of this image IM6 will be allowed to pass. The temporal position of this image IM6, as well as the sampling interval corresponding to the second pulse I2a, are plotted on the sinusoid VIB representing the vibration f. It is seen that this sampling interval, labelled by a double arrow, has a relative position, with respect to the period T, which is unchanged with respect to the preceding period T. By contrast, the image IM6 which is being sampled does not occupy the same relative position, with respect to the period T, as the previously sampled image IM2 occupied. This explains why a sample of the video signal SV is transmitted to the memory 7, and corresponds to another portion of the image which the filming device 2 perceives when it is oriented in the direction defined by the temporal position of the sampling pulses. Thus, since it is not possible, owing to the vibration f, to take en bloc the whole video signal SV relating to a precisely specified orientation of the line of sight 1, successive samplings are performed which are stored, and which relate to different portions of the image perceived according to said direction, and this image is reconstituted by juxtaposing these video signals, each of which represents an image portion.

This assumes that the frequency of the vibrations f is not synchronized with the frequency of repetition of the images generated by the filming device 2, so that there is a sliding of the interval of sampling with respect to the period T, and so that the various portions of the image are sampled. This also assumes that the chosen observed scene has not changed during the time taken to reconstitute an image, for example 2 seconds.

The fact that the various samples of the video signal SV are not mutually synchronized does not present any disadvantage: in the case where a portion of a sampled video signal corresponds to a homologous portion of a preceding sampled signal, this part overwrites, in the memory 7, the oldest stored signal, this ensuring a refreshing of the image information; likewise, an absence of refreshing of a small portion of the reconstituted image 9R is not detrimental.

In this same FIG. 2 has been represented a second series of synchronizing pulses S1b and S2b, which are generated when the vibration has an amplitude VIB of like absolute value, and of opposite sign, as that for which the synchronizing pulses S1a and S2a are generated. As a result, this second series of pulses S1b and S2b is phase-shifted by a half-period T with respect to the synchronizing pulses S1a and S2a. Thus, the sampling pulses I1b and I2b, generated respectively from these synchronizing pulses S1b and S2b, are also phase-shifted by a half-period T with respect to the corresponding pulses I1a and I2a. This leads to sampling a video signal SV relating to an orientation of the line of sight 1 which is arranged symmetrically, with respect to the stationary position, to the orientation corresponding to the first series of samplings set out above. Thus, a second reconstituted image 9b is obtained occupying, with respect to the stationary reconstituted image 9R on the display device 8, a position symmetrical with the first image 9a.

Figure 3:
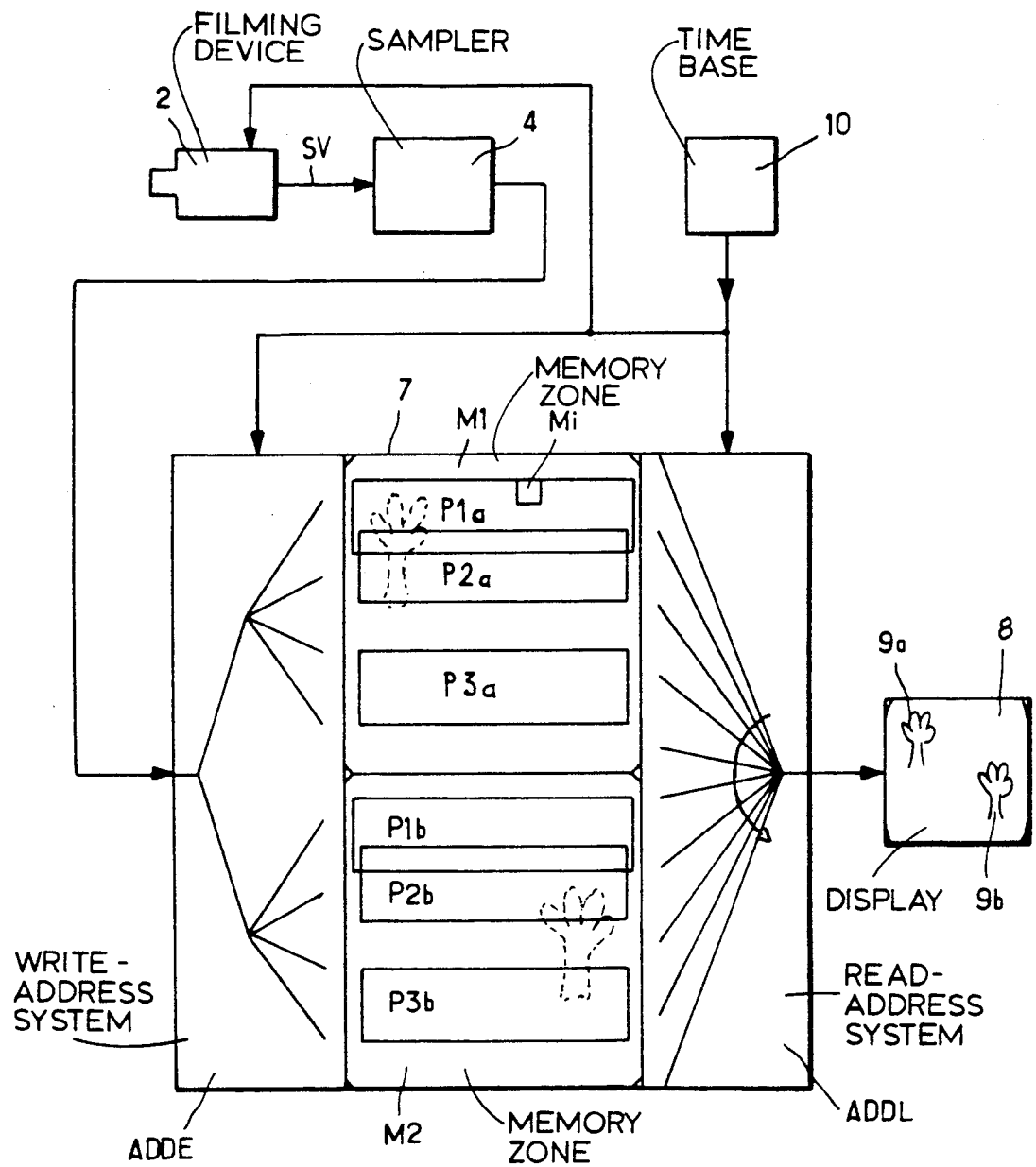
FIG. 3 is a diagrammatic representation of the ordering in memory of the various samples of video signal.

Since these two series of samplings are performed in a time-interlaced manner, the memory 7 includes two zones M1 and M2, represented in FIG. 3, each corresponding to a reconstituted image 9a or 9b. In the drawing of the memory, the position of the information items representative of each of the reconstituted images 9a and 9b is sketched with a dotted line reproducing said images.

Each zone M1 or M2 consists of a set of memory points Mi containing the information item relating to a specific point of the relevant image. Upon the arrival of a sampled video signal SV, representing successive points of an image, for example a few lines from the frame of the image, the signal is routed successively, by means of a write-addressing system ADDE of the memory 7, towards the various memory positions corresponding to these memory points Mi, thereby refreshing the image information, whereas the information item relating to the other image points remains unchanged. This memorizing can be done in analog fashion or else digitally, with prior analog/digital conversion, in the case where the video signal SV is analog. To determine to which portion of the image a sampled signal which arrives at the memory 7 corresponds, it is sufficient, for example, to drive, by means of the time base 10, the frame of the electronics for scanning the image taken by the filming device 2; thus, this time base 10 is able to know, at any moment, which is the portion of the image frame which has just been read, and can therefore route it towards the appropriate memory points, by means of an address signal applied to the input of the write-addressing part ADDE of this memory 7.

Three portions of the image of each zone, respectively P1a, P2a, P3a and P1b, P2b, P3b which have just been refreshed are represented. It is seen that, in this example, the image information from certain of the image points, and defined by P1a, has been replaced by the image information provided by the sampled signal P2a which followed P1a. A plurality of such signals enables the whole, or at least the major portion, of the memory 7 to be filled in a given time.

Another possibility for performing the addressing of the memory 7 is to have a video signal SV which itself provides this information, for example at the start of each line of the frame of the image, this avoiding the need for synchronization of the filming device 2 by the time base 10. In this case, address-recognition logic recognizes the address of the line in the frame and controls the addressing of the memory 7. The expert in the area of addressing by auto-routing will be able to realize the device according to the invention.

Likewise, an image synchronizing signal, provided by the filming device 2, can also serve in determining the address in the memory 7. To do this, the video signal SV arrives continuously at the memory 7, which is then addressed by the frame and line synchronizing signals, just like a television screen, but which only allows memory writing when the sampling signal so allows.

This memory 7 is, alternately in time with its writing, read synchronously by the time base 10, which thus reads the successive lines of the frame constituting the image and controls the display device 8 accordingly. This reading is symbolized by a link going towards said display device 8 leaving the memory 7, with a successive addressing, by a read-addressing device ADDL, schematized with an arrow, of the various addresses of the memory 7 containing the image information items.

Figure 4:
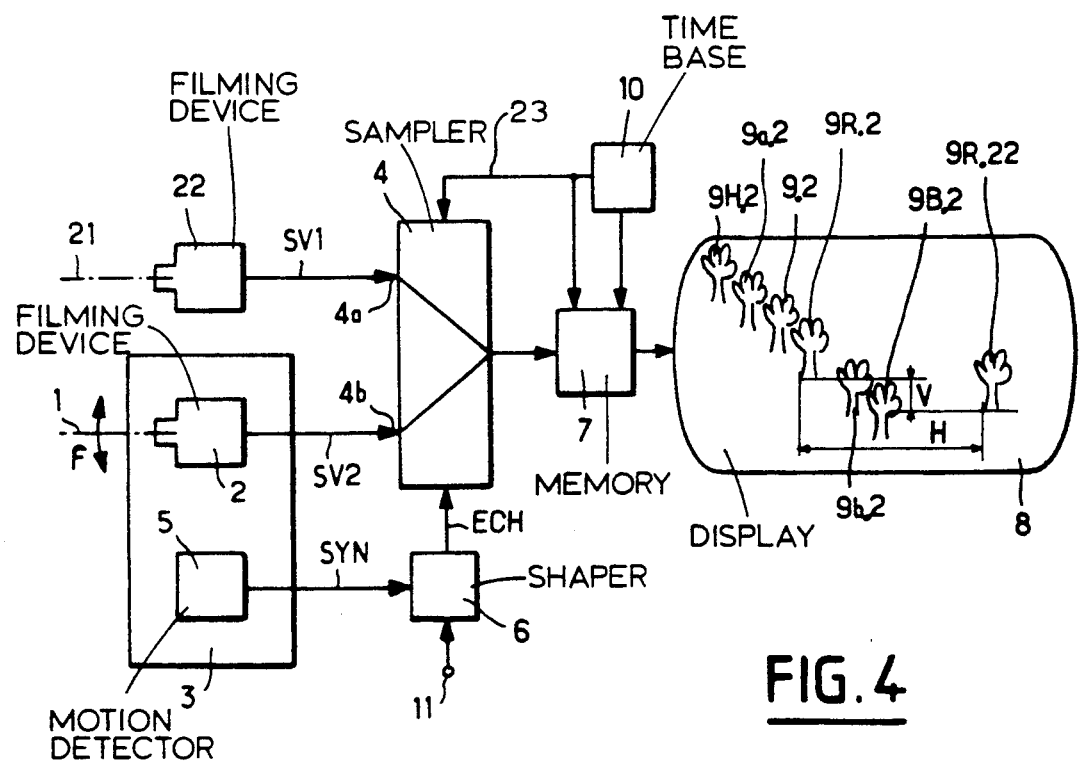
FIG. 4 is a block diagram illustrating the method of determining the harmonization error of two filming devices, utilizing a single sampler.

The diagram represented in FIG. 4 is intended to permit determination of the harmonization error between the stationary line of sight of a filming device 2 subject to vibrations f, and the line of sight 21 of a second filming device 22, this fixed line of sight 21 being oriented substantially towards the same observed field as the line of sight 1. This scene is situated a sufficiently large distance away for the parallax error to be negligible. Furthermore, the sampler 4 includes a first signal input and a second signal input, 4a and 4b respectively. The operations described in connection with FIGS. 1 to 3 are performed as described, the first filming device 2 providing a first video signal SV1 applied to the first signal input 4a of the sampler 4, whereas the second filming device 22 delivers a second video signal SV2 applied to the second signal input 4b of said sampler 4. Moreover, the time base 10 provides, through a link 23, a switching signal applied to the sampler 4 and to the memory 7, which has the effect of routing alternately, towards the output of said sampler 4, the sampled signal coming from the first signal input 4a or from the second signal input 4b. The memory 7 thus receives, and orders appropriately, slices of video signals enabling it to provide a first stationary reconstituted image 9R.2 and a second stationary reconstituted image 9R.22 coming respectively from the two filming devices 2 and 22, and can then superimpose them on the display device 8, by interlacing or rapid alternation.

The determination of the position of the first stationary reconstituted image 9R.2 is performed as explained previously, by marking the extreme positions 9H.2 and 9B.2 of the displacement of the first reconstituted image 9.2, or by obtaining two first reconstructed images 9a.2 and 9b.2, arranged symmetrically with respect to the first stationary reconstructed image 9R.2.

The horizontal H and vertical V offsets between said stationary reconstituted images 9R.2 and 9R.22 are indicative respectively of the harmonization error between the filming devices 2 and 22.

To perform the adjustment of the harmonization, it is then sufficient to swivel one of the two filming devices 2 or 22 in such a way as to bring the two respective stationary reconstituted images 9R.2 and 9R.22 towards one another, until they merge.

Figure 5:
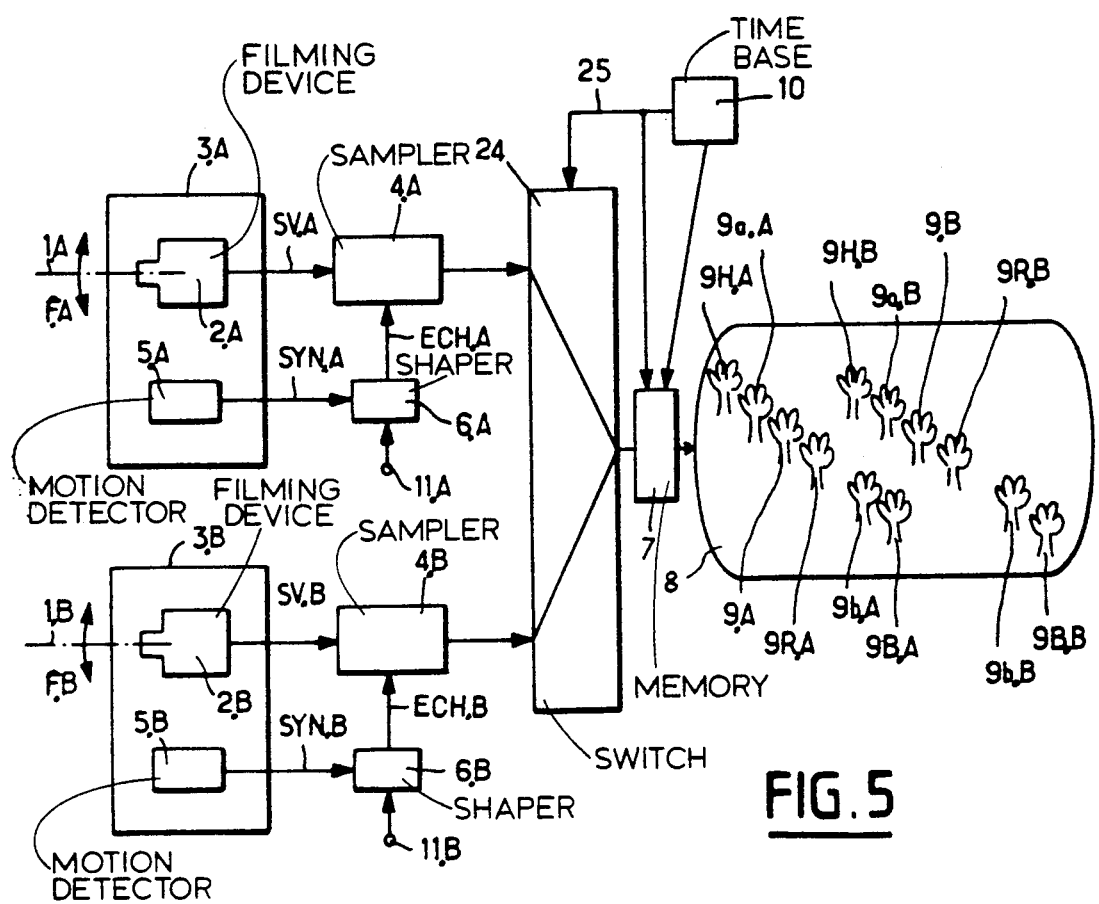
FIG. 5 is a block diagram illustrating the method of determining the harmonization error of two filming devices liable to be subject respectively to mutually differing vibrations.

FIG. 5 illustrates a method of determining the harmonization error between a first line of sight 1.A of a first filming device 2.A and a second line of sight 1.B of a second filming device 2.B, each integral respectively with a chassis 3.A and 3.B, liable to be subject respectively to first vibrations f.A and second vibrations f.B, which can be of differing frequencies, or simply of differing phases.

Each filming device 2.A and 2.B provides respectively a first video signal SV.A and a second video signal SV.B, which are sampled respectively, as explained in connection with FIG. 1, by a first sampler 4.A and a second sampler 4.B receiving respectively a first sampling signal ECH.A and a second sampling signal ECH.B arising respectively from a first shaping circuit 6.A, possibly having an input 11.A for adjusting the delay, and from a second shaping circuit 6.B possibly having an input 11.B for adjusting the delay. A first motion detector 5.A, integral with the first chassis 3.A, provides said first shaping circuit 6.A with a first synchronizing signal SYN.A, whereas a second motion detector 5.B, integral with the second chassis 3.B, provides said second shaping circuit 6.B with a second synchronizing signal SYN.B.

The description relating to the various steps, as well as the possible variants, which are explained in connection with FIGS. 1 to 4, is valid once again. However, before write-access to the memory 7, a switching step is interposed, carried out by means of a switch 24, receiving, on a first signal input, the first sampled video signal arising from the first sampler 4.A and receiving, on a second signal input, the second sampled video signal arising from the second sampler 4.B. This switch 24 receives, originating from the time base 10, through a link 25, a switching signal applied to a switching-control input, which has the effect of making the first sampled video signal or the second sampled video signal appear alternately on an output, connected to the memory 7, of said switch 24. The memory 7 receives this switching signal, this enabling it to determine the write address.

The position is thus determined of a first stationary reconstituted image 9R.A and of a second stationary reconstituted image 9R.B. This determination of the position can be performed by determining the extreme positions of displacement 9H.A, 9B.A and 9H.B, 9B.B, of respectively, the first reconstituted image 9.A and the second reconstituted image 9.B, this by acting on a delay-control input 11.A and 11.B of the respective shaping circuits 6.A and 6.B. It is also possible to create a pair of first images 9a.A and 9b.A and a pair of second images 9a.B and 9b.B, which are arranged symmetrically with respect to the position of the corresponding stationary reconstituted image 9R.A or 9R.B.

The other steps, for determining the harmonization error and for correcting this error, are identical to those set out in connection with FIG. 4.

Figure 6:
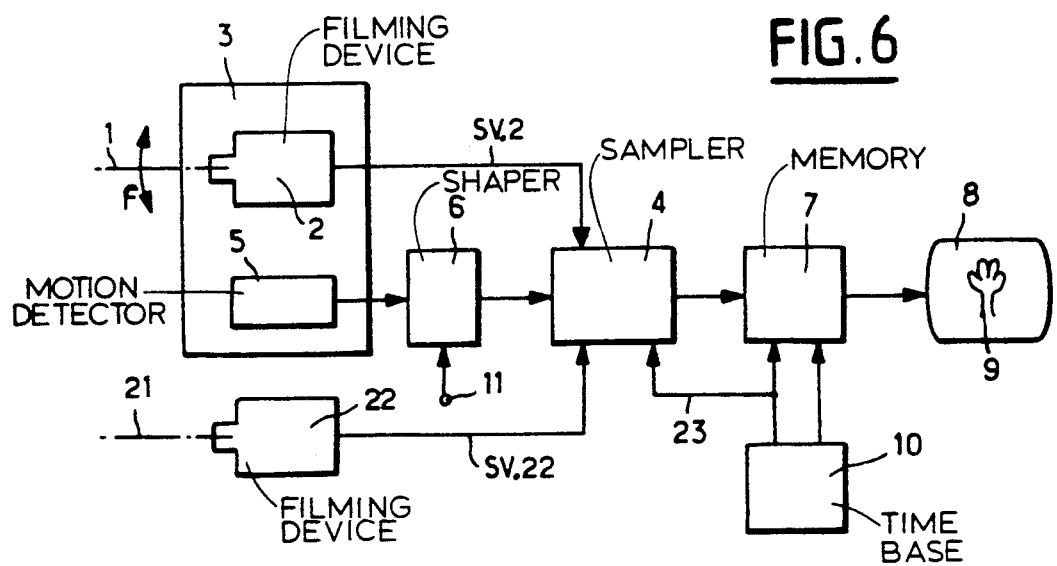
FIG. 6 is a block diagram showing the layout, according to the invention, of the components of a device for determining the orientation of a filming device subject to vibrations, as well as those of a device for determining the harmonization error between two filming devices.

The basic diagram represented in FIG. 6 illustrates a device making it possible to determine the orientation of the line of sight 1 of a filming device 2 subject to vibrations f, as well as a device making it possible to determine the harmonization error between the respective lines of sight 1 and 21 of a first filming device 2 and of a second filming device 22, and to correct it.

The functioning corresponds to that described in connection with FIG. 4.

The filming devices 2 and 22 each consist of a video camera providing respectively a first video signal SV.2 and a second video signal SV.22 respectively representative of the successive lines of the frame of a first image from the first filming device 2 and of a second image from the second filming device 22, respectively representative of the field of the relevant camera. The sampler 4 consists, on each signal input, of an analog gate with wide pass band and with sufficient dynamic range not to deform the video signal. The motion detector 5 is an accelerometer capable of detecting a predetermined value of acceleration, and optionally capable of detecting a predetermined absolute value of this acceleration, in order to provide two synchronizing signals per period T of vibration f. The shaping circuit 6 is a monostable circuit, providing a pulse of specified duration in response to the synchronizing signal, with, in series, an adjustable delay circuit, for example a circuit including a resistive circuit and a capacitor, placed at the input of said monostable circuit, the resistive circuit including a potentiometer controlled by the delay control input 11. The memory 7 is an analog memory with large pass band, or else a digital memory, with input associated with an analog/digital convertor, and with output associated with a digital/analog convertor if the display device 8 is a video screen with analog control providing an image 9. The stored video signal can contain the line and frame synchronizing information items of the signal arising from the filming device 2 or 22, this permitting direct control of the synchronization of the video screen.

The time base 10 consists of a quartz oscillator controlling a digital frequency divider providing the signals for sequencing the functioning of the memory 7 and for switching, the latter signal having the effect of blocking, depending on its state, one or other of the two analog gates of the sampler 4.

It will be apparent to the expert that the above description makes it possible to embody devices capable of implementing the methods described.

In particular, in the case where the object sighted is not at infinity, which is often the case when the harmonization must be done on a cluttered site, for example in respect of military helicopters in low altitude tactical flight, the parallax error can be calculated and corrected in elevation and in bearing in a known manner by taking account of the relative position of the two cameras in the reference frame tied to their support structure and of the distance between the sighted object and said cameras.

If ds is the elevation distance between the two cameras, and if dc is the bearing distance between the two cameras and if furthermore D is the distance between the camera giving the reference line of sight and the sighted object, measured by means of a telemeter for example, the elevation parallax correction will be equal to ds/D radians and the bearing parallax correction will be equal to dg/D radians.

Starting from the position of the cameras such that their respective images are superimposed, the other camera will have to be swivelled by the angles thus calculated in order for the two lines of sight to be parallel.

I claim:

1. A method for determining the stationary position of the line of sight (1) of a filming device (2), subject to periodic vibrations (f) and delivering a video signal representing the image of the field which it is observing, said method comprising the following steps:
   detecting the said vibrations (f) and generating from them a succession of synchronizing signals each having a specified phase within the period (T) of said vibrations (f);
   generating from the said succession of synchronizing signals a succession of sampling signals each having a same adjustable delay with respect to the corresponding synchronizing signal;
   sampling said video signal by means of the succession of said sampling signals, thus providing a succession of sampled video signals;
   reconstituting said image on a display device (8), by means of the succession of said sampled video signals, thus providing a reconstituted image (9); and
   determining the position of the stationary reconstituted image (9R) corresponding to the stationary line of sight (1) from the reconstituted image (9).

2. The method as claimed in claim 1, wherein the position of the stationary reconstituted image (9R) corresponding to the stationary line of sight (1) is determined by means of the following steps:
   determining the extreme positions (9H, 9B) of the displacement of the reconstituted image (9) on the display device (8), by varying said adjustable delay; and
   setting said adjustable delay in such a way that the reconstituted image (9) occupies a position midway between said extreme positions (9H, 9B).

3. The method as claimed in claim 1, wherein, during each period (T) of the vibration (f), two synchronizing signals are generated spaced half a vibration period (f) apart, this causing the formation of a pair of reconstituted images (9a, 9b).

4. The method as claimed in claim 3, wherein said adjustable delay is set in such a way as to superimpose the reconstituted images (9a, 90b) of said pair of reconstituted images, on the display device (8).

5. A method of harmonizing a first filming device (2), subject to periodic vibrations (f), with respect to a second filming device (22) oriented fixedly substantially in the same direction as said first filming device (2), providing respectively a first video signal and a second video signal, representing respectively a first image and a second image corresponding respectively to the image of their observed field, said methods comprising the following steps:

detecting the said vibrations (f) and from them generating a succession of synchronizing signals each having a specified phase within the period (T) of said vibrations;

generating from the said succession of synchronizing signals a succession of sampling signals each having same adjustable delay with respect to the corresponding synchronizing signal;

sampling said first video signal and second video signal alternately by means of the succession of first sample video signals and second sampled video signals;

reconstituting said first image and second image on a display device (8) by means of the succession of said sampled video signals, thus providing a first reconstituted image (9.2) and a second stationary reconstituted image (9R.22);

determining the respective positions of the first stationary reconstituted image (9R.2) and of the second stationary reconstituted image (9R.22) corresponding respectively to the stationary line of sight (1) of the first filming device (2) and to the line of sight (21) of the second filming device (22), from the first reconstituted image (9.2) and the second stationary reconstituted image (9R.22); and determining from said respective positions of the first stationary reconstituted image (9R.2) and of the second stationary reconstituted image (9R.22) the angular harmonization deviation of said first filming device (2) and second filming device (22).

6. The method as claimed in claim 5, in which the determination of the respective positions of the first stationary reconstituted image (9R.2) and of the second stationary reconstituted image (9R.22) comprises the following steps:

determining the extreme positions (9H.2, 9B.2) of the displacement of the first reconstituted image (9.2) by varying said adjustable delay; and setting said adjustable delay in such a way that said first reconstituted image (9.2) occupies a position midway between said extreme positions (9H.2, 9B.2).

7. The method as claimed in claim 5, wherein, during each period (T) of the vibration (f), two synchronizing signals (S1a, S1b) are generated spaced apart by half a vibration period (f), this causing the formation of a pair of first reconstituted images (9a.2, 9b.2) and of a second stationary reconstituted image (9R.22), corresponding respectively to the first video signal and to the second video signal.

8. The method as claimed in claim 7, wherein said adjustable delay is set in such a way that, on the display device (8), the two reconstituted images of said pair of first reconstituted images (9a.2, 9b.2) are superimposed.

9. The method as claimed in claim 5, applied to a first filming device (2) and to a second filming device (22), at least one of which is able to swivel, under the effect of a swivel command, in a direction of swivel permitting adjustment of the harmonization of said filming devices (2,22), said method comprising the following step:

activating said swivel command in such a way as to bring said first stationary reconstituted image (9R.2) and second stationary reconstituted image (9R.22) towards one another.

10. Method of determining the harmonization error of a first line of sight (1.A) of a first filming device (2.A), subject to first periodic vibrations (f.A), with respect to a second line of sight (1.B) of a second filming device (2.B), subject to second periodic vibrations (f.B), oriented substantially in the same direction as said first filming device (2.A), providing respectively a first video signal and a second video signal, respectively representing the image of their observed field, said method comprising the following steps:

detecting said first vibrations (f.A) and from them generating a succession of first synchronizing signals each having a specified phase within the period (T.A) of said first vibrations (f.A);

detecting said second vibrations (f.B) and from them generating a succession of second synchronizing signals each having a specified phase within the period (T.B) of each of said second vibrations (f.B);

generating from said succession of first synchronizing signals a succession of first sampling signals each having the same adjustable delay with respect to the first corresponding synchronizing signal;

generating from said succession of second synchronizing signals a succession of second sampling signals each having the same adjustable delay with respect to the second corresponding synchronizing signal;

sampling said first video signal and second video signal by means, respectively, of the succession of first sampling signal and second sampling signal, thus providing respectively a succession of first sample video signals and a succession of second sampled video signals;

reconstituting said first image and second image on a display device (8) by means of said succession of first sampled video signals and succession of second sample signals, thus providing a first reconstituted image (9.A) and a second reconstituted image (9.B);

determining the respective positions of the first stationary reconstituted image (9R.A) and of the second stationary reconstituted image (9R.B) corresponding respectively to the stationary line of sight (1.A) of the first filming device (2.A) and to the stationary line of sight (1.B) of the second filming device (2.B), from the first reconstituted image (9.A) and second reconstituted image (9.B); and determining from said respective positions of the first stationary reconstituted image (9R.A) and of the second stationary reconstituted image (9R.B) the angular harmonization deviation of said first line of sight (1.)A and second line of sight (1.B).

11. The method as claimed in claim 10, wherein the respective positions of the first stationary reconstituted image (9R.A) corresponding to the first stationary line of sight (1.A) and of the second stationary reconstituted image (9R.B) corresponding to the second stationary line of sight (1.B), are determined by the following steps:

determining the extreme positions (9H.A, 9B.A) of the displacement of the first reconstituted image (9.A) of the first filming device (2.A) by varying said first adjustable delay;

setting said first adjustable delay in such a way that said first reconstituted image (9.A) occupies a position midway between said first extreme positions (9H.A, 9B.A);

determining the second extreme positions (9H.B, 9B.B), of the displacement of the second reconstituted image (9.B) of the second filming device (2.B) by varying said second adjustable delay;

setting said second adjustable delay in such a way that said second reconstituted image (9.B) occupies a position midway between said second extreme positions (9H.B, 9B.B).

12. The method as claimed in claim 10, wherein two synchronizing signals are generated spaced apart by half a vibration period (f.A, f.B), this causing the formation of a pair of first reconstituted images (9a.A, 9b.A) and of a pair of second reconstituted images (9a.B, 9b.B), corresponding respectively to the first video signal and to the second video signal.

13. The method as claimed in claim 12, wherein said first adjustable delay and second adjustable delay are set in such a way that, for each pair of said reconstituted images (9a.A, 9b.A; 9a.B, 9b.B), said first reconstituted image and second reconstituted image are superimposed, on the display device (8).

14. The method as claimed in claim 10, applied to a first filming device (2.A) and to a second filming device (2.B), at least one of which is able to swivel, under the effect of a swivel command, in a direction of swivel permitting adjustment of the harmonization of said filming devices (2.A, 2.B), said method comprising the following step:
activating said swivel command in such a way as to bring together the respective reconstituted images relating to the stationary direction (9R.A, 9R.B) of the first filming device (2.A) and of the second filming device (2.B).

15. Device for determining the orientation, with respect to a fixed reference frame, of the stationary line of sight (1) of a first filming device (2) subject to vibrations (f), and providing a first video signal representing the image of its field, wherein it comprises:

a motion detector (5) detecting said vibrations (f), and producing a synchronizing signal having a specified phase with respect to said vibrations (f);

a shaping circuit (6) receiving said synchronizing signal and providing, in response, a sampling signal;

a sampler (4) receiving said first video signal on a first signal input, able to sample said first video signal and provide a first sampled video signal, under the control of said sampling signal applied to a sampling control input;

a memory (7), receiving and storing said first sampled video signal;

a display device (8), receiving, from said memory (7), an image information item and providing, in response, a reconstituted image (9);

a time base (10) controlling the sequencing of the operation of said memory (7).

16. The device as claimed in claim 15, wherein said shaping circuit (6) provides a sampling control signal delayed with respect to said synchronizing signal.

17. The device as claimed in claim 15, wherein said motion detector (5) provides two synchronizing signals during each period (T) of said vibrations (f), said signals being spaced apart by half said period (T).

18. The device as claimed in claim 16, wherein said shaping circuit (6) comprises a delay control input (11) enabling said delay to be adjusted.

19. Device for determining the harmonization error between a first line of sight (1) of a first filming device (2) associated with a device for determining the stationary position of this first line of sight (1), as claimed in claim 15, and a second line of sight (21) of a second filming device (22) oriented fixedly substantially in the same direction as said first line of sight (1), providing a second video signal representing a second image representing the field which it is observing, wherein said second video signal is applied to a second signal input of said sampler (4), and wherein said time base (10) provides said sampler (4) with a switching signal making a sampled video signal representing respectively said first video signal and second video signal appear alternately at the output of said sampler (4).

* * * * *

UNITED STATES PATENT AND TRADEMARK OFFICE
CERTIFICATE OF CORRECTION

PATENT NO. : 5,309,250
DATED : May 3, 1994
INVENTOR(S) : EMMANUEL MICHEL GIACOMETTI

It is certified that error appears in the above-identified patent and that said Letters Patent is hereby corrected as shown below:

Column 9, line 8, "spaces" should be --spaced--;

Column 14, line 15, "dc" should be --dg--;

Column 15, line 1, "90b" should be --9b--;

Column 15, line 21, after "of" (second occurrence), insert --said sampling signals, thus providing a succession of--;

Column 15, line 22, "sample" should be --sampled--;

Column 16, line 41, "sample" should be --sampled--;

Column 16, line 46, "sample" should be --sampled--;

Signed and Sealed this

Sixth Day of September, 1994

Attest:

BRUCE LEHMAN

*Attesting Officer*  *Commissioner of Patents and Trademarks*